United States Patent
Hopkins, Sr.

(10) Patent No.: US 7,141,771 B2
(45) Date of Patent: Nov. 28, 2006

(54) MICROWAVE COOKING TRAY WITH MULTIPLE FLOOR PATTERNS

(75) Inventor: Gary L. Hopkins, Sr., Scottsburg, IN (US)

(73) Assignee: Steamway Franchise Sales, Inc., Scottsburg, IN (US)

( * ) Notice: Subject to any disclaimer, the term of this patent is extended or adjusted under 35 U.S.C. 154(b) by 0 days.

(21) Appl. No.: 10/729,687

(22) Filed: Dec. 5, 2003

(65) Prior Publication Data

US 2004/0134358 A1 Jul. 15, 2004

Related U.S. Application Data

(60) Provisional application No. 60/440,228, filed on Jan. 15, 2003.

(51) Int. Cl.
*H05B 6/80* (2006.01)
*B65B 55/00* (2006.01)

(52) U.S. Cl. ............... 219/728; 219/732; 219/735; 219/745; 426/113; 426/234; 426/243; 99/DIG. 14; 229/903

(58) Field of Classification Search ........ 219/725–735, 219/762, 745; 99/DIG. 14; 426/107, 113, 426/118, 234, 243, 241; 229/902–904
See application file for complete search history.

(56) References Cited

U.S. PATENT DOCUMENTS

| | | | |
|---|---|---|---|
| 2,633,284 A | | 3/1953 | Moffett et al. |
| 3,271,169 A | * | 9/1966 | Baker et al. ............... 426/107 |
| 3,302,632 A | * | 2/1967 | Fichtner ..................... 219/728 |
| 3,835,281 A | | 9/1974 | Mannix |
| 4,058,214 A | | 11/1977 | Mancuso |
| 4,317,017 A | | 2/1982 | Bowen |
| 4,529,089 A | | 7/1985 | Gasbarra et al. |
| 4,560,850 A | | 12/1985 | Levendusky et al. |
| 4,640,838 A | * | 2/1987 | Isakson et al. .............. 426/107 |
| 4,834,247 A | | 5/1989 | Oshima et al. |
| 4,866,232 A | * | 9/1989 | Stone ......................... 219/730 |
| 4,923,704 A | | 5/1990 | Levinson |
| 4,933,526 A | * | 6/1990 | Fisher et al. ................ 219/730 |
| 5,062,356 A | * | 11/1991 | Frankowski ................. 99/428 |
| 5,229,564 A | * | 7/1993 | Chiba ......................... 219/732 |
| 5,310,981 A | | 5/1994 | Sarnoff et al. |
| 5,369,034 A | | 11/1994 | Hargett et al. |
| 5,587,192 A | | 12/1996 | Beizermann |
| 5,750,967 A | | 5/1998 | Sprauer, Jr. |
| 5,780,824 A | * | 7/1998 | Matos ........................ 219/727 |
| 6,187,354 B1 | * | 2/2001 | Hopkins ..................... 426/234 |
| 6,627,862 B1 | * | 9/2003 | Pedersen .................... 219/730 |

* cited by examiner

*Primary Examiner*—Philip H. Leung
(74) *Attorney, Agent, or Firm*—Carrithers Law Office PLL; David W. Carrithers

(57) ABSTRACT

A microwave cooking tray comprises a base having at least two compartments. Each compartment of the base has a bottom surface defining a pattern, the bottom surface of one of the compartments defining a first pattern and a bottom surface of a second of the compartments defining a second pattern. The first and second patterns are distinct and each is designed for optimal cooking of a particular type of food product.

6 Claims, 2 Drawing Sheets

MICROWAVE COOKING TRAY WITH MULTIPLE FLOOR PATTERNS

CROSS REFERENCES TO RELATED APPLICATIONS

This application claims priority from U.S. Provisional Application Ser. No. 60/440,228 filed Jan. 15, 2003, the entire disclosure of which is incorporated herein by this reference.

FIELD OF THE INVENTION

The present invention relates to the field of cooking devices, and, more particularly, to cooking devices for use in a microwave oven for cooking meats, vegetables, and other food products.

BACKGROUND OF THE INVENTION

Consumers often prefer to cook food in a microwave oven rather than conventional ovens because of the reduced cooking time required to heat foods in a microwave oven. Consumers also want to be provided with the opportunity to cook pre-packaged food products in the package in which they were purchased without the hassle of transferring the food from one container to the next. Consumers further want to be provided with pre-packaged microwave oven meals which allow a dinner with several different courses to be prepared at one time.

Unfortunately, foods cooked in a microwave oven tend to be tough and/or dry in texture and consistency, rather than tender and moist. When liquid is added to the food in an attempt to retain moisture, the food can become soggy and undesirable. In addition, microwave ovens do not evenly distribute heat to the product being cooked. This results in a cooked food product that may be very hot in one area, but cold in another area. Because of these problems, many people consider microwave cooking to be problematic and generally undesirable.

One method for improving the texture and consistency of food cooked in a microwave oven is to use steam generated by the heated food product to assist in cooking the food. Cooking with steam not only provides moisture for the food being cooked, but also results in more consistent heating throughout the food product. Such a steam cooking method is described in commonly assigned U.S. Pat. No. 6,559,431, which is incorporated herein by reference.

One problem with consistently cooking various types of foods by this method is that steam generated by these various types of foods, when they are heated, differs based on the moisture content of the particular food being cooked. Because different amounts of steam will be produced when different foods are heated, and because different foods have different original textures and consistencies, the size and shape of the microwave cooking tray being used to steam cook a particular food plays an important role in that food's final texture and consistency. For example, by changing the shape of the compartment, the path of the steam used to cook the food may be manipulated to provide the best cooking environment.

When a microwave oven meal is being prepared, several different types of foods are often being heated simultaneously. If separate containers of an appropriate size and shape to steam cook each individual item are being used to simultaneously prepare the several different types of food, it becomes a hassle to juggle the various containers. If a single microwave cooking tray is used, the texture and consistency of some of the foods must be sacrificed.

Therefore, it would be desirable to provide a microwave cooking tray for steam cooking having multiple independent compartments, the size and shape of each being designed to provide an optimal environment for cooking the type of food contained therein. Such a design would allow several different types of foods to be prepared in a single tray without sacrificing texture and consistency of any of the foods.

SUMMARY OF THE INVENTION

The present invention is a microwave cooking tray having a base, with at least two different compartments for holding food, and a covering, such as a clear film heat seal, a lid, or a vacuum-sealed covering. The microwave cooking tray of the present invention uses the steam generated by the heated food product to assist in cooking the food. Specifically, the production of steam causes the pressure to build within each compartment, which, in turn, allows the temperature within each compartment to increase to a greater extent then it would at ambient pressures.

Because different amounts of steam are produced when different foods are heated, and because different foods have different original textures and consistencies, the size and shape of each compartment of the microwave cooking tray plays an important role in that food's final texture and consistency. Therefore, in the microwave cooking tray of the present invention, the bottom surface of each compartment may be flat or have one of several other patterns raised therefrom to provide an elevated cooking plane. For example, the bottom surface could have: a ribbed pattern, with a plurality of rib projections; a sinusoidal pattern, with a plurality of sinusoidal projections; or a pyramidal pattern, with a plurality of pyramid-shaped projections. When the bottom surface of a compartment has raised projections, steam channels or pathways of various shapes are formed between the projections and beneath the cooking plane, allowing steam to travel all around the food cooked in the tray. The size and shape of the steam channels created by the floor pattern will differ based on the type of floor pattern being used, thereby creating unique cooking environments.

By creating a steam cooking microwave cooking tray having multiple compartments each with a floor pattern designed to provide an optimal cooking environment for the type of food contained therein, various food combinations can be cooked in a single tray while ensuring that each type of food is able to achieve a desired texture and consistency.

DESCRIPTION OF THE INVENTION

Figure 1:
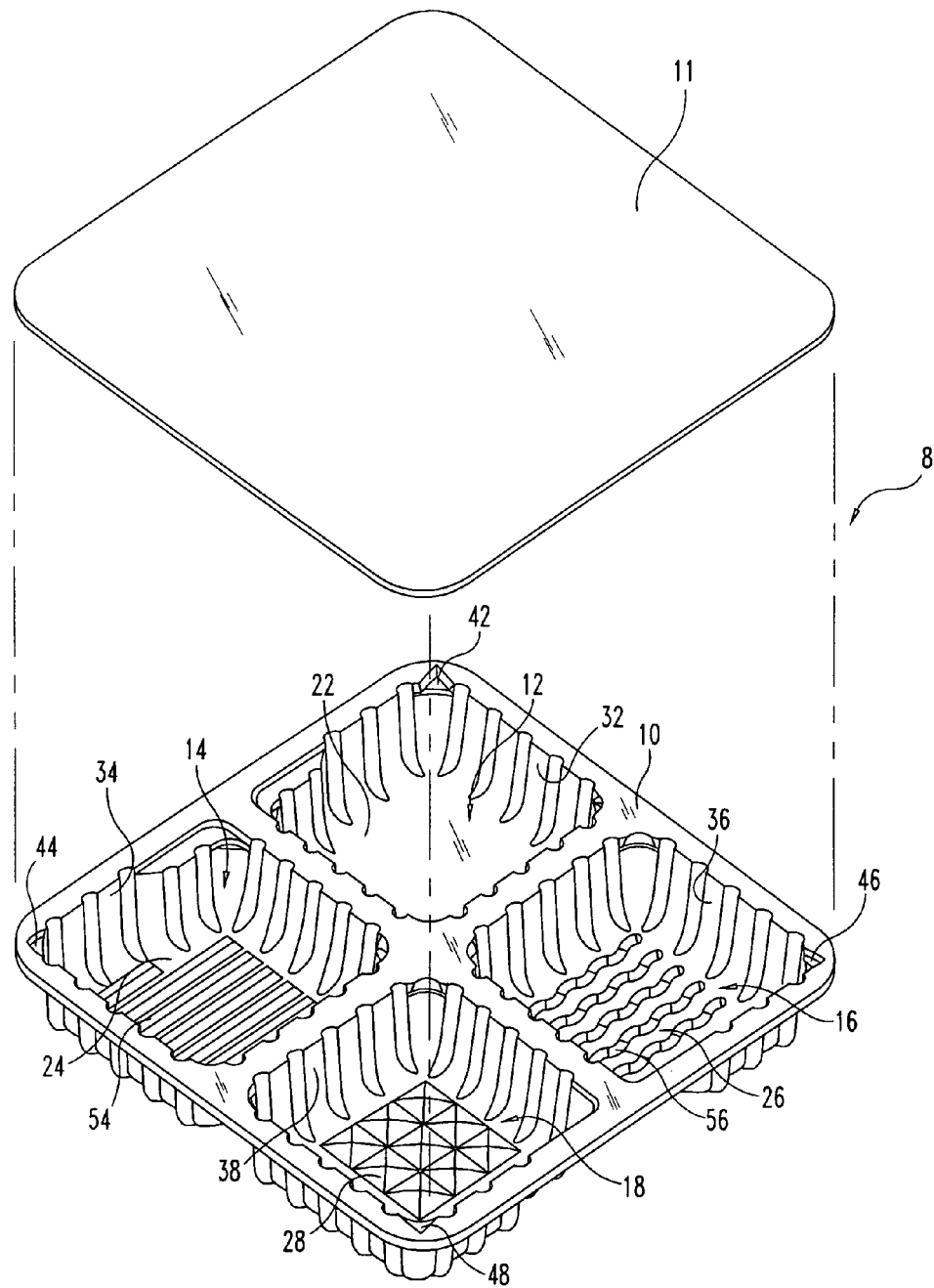
FIG. 1 is an exploded perspective view of a preferred microwave cooking tray made in accordance with the present invention.

With reference to FIG. 1, the present invention is a microwave cooking tray 8 having a base 10, with at least two different compartments for holding food, and a covering 11. The covering 11 shown in FIG. 1 is a film which is sealed to the base 10; however, a variety of coverings may be used and secured to the base 10 by a variety methods without departing from the spirit and scope of the present invention, for example, a snap-on lid or a vacuum pack bag could also serve as the covering 11.

Figure 2:
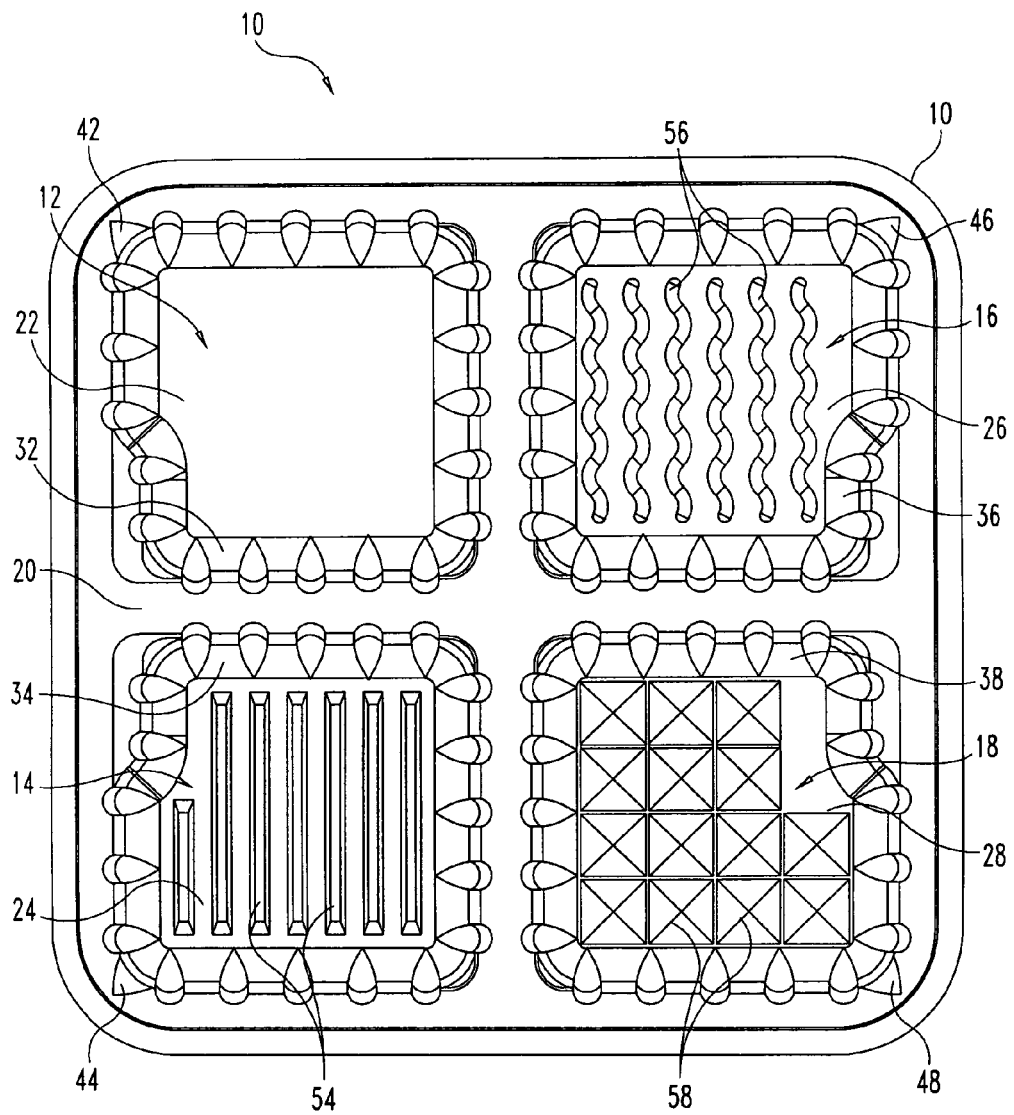
FIG. 2 is a plan view of the base of the preferred microwave cooking tray of FIG. 1.

FIGS. 1–2 show one embodiment of the base 10 of the microwave cooking tray 8 having four different compartments 12, 14, 16, 18. Of course, the tray 8 can have fewer or more compartments without departing from the spirit and scope of the present invention. The base 10 of the tray 8 is preferably made of a polypropylene, food-grade plastic. The tray 8 is transparent to radiant energy, such as energy from a microwave oven. Each compartment 12, 14, 16, 18 of the base 10 has a bottom surface 22, 24, 26, 28 with a respective continuous side wall 32, 34, 36, 38 extending therefrom and terminating at a plane 20 defining the top of the tray 8, a plane 20 that is substantially parallel to the bottom surfaces 22, 24, 26, 28 of the individual compartments 12, 14, 16, 18. The respective side walls 32, 34, 36, 38 of each compartment serve as dividers to keep food products contained therein from mixing and to help define the self-contained steam cooking environments of each compartment 12, 14, 16, 18.

The microwave cooking tray 8 of the present invention uses the steam generated by the heated food product to assist in cooking the food taking advantage of the ideal gas law, a distillation of several kinetic theories including Boyle's Law and Gay-Lussac's Law. More specifically, the microwave cooking tray 8 of the present invention takes advantage of the proportional relationship between pressure and temperature when volume and number of gas molecules remain constant. This proportional relationship can be expressed as a mathematical equation, $(P_2/P_1)=(T_2/T_1)$, where $P_1$ is the initial pressure, $P_2$ is the final pressure, $T_1$ is the initial temperature, and $T_2$ is the final temperature. Accordingly, any increase in pressure will result in a proportional increase in temperature that would not occur at ambient pressures. For example, if the pressure was to increases 1.2 fold (e.g., from 1 to 1.2 atmospheres), the temperature would also increase 1.2 fold (e.g., from 275 K to 330 K, which is an increase from 35° F. to 134° F.).

Each individual compartment 12, 14, 16, 18 of the tray 8 is sealed such that its volume remains constant until the pressure from the steam increases to a point that it causes a vent 42, 44, 46, 48 to open. The particular type of vent used is not important for purposes of the present invention; indeed various venting configurations could be used without departing from the spirit and scope of the present invention. Because the volume remains constant until venting occurs, the pressure within each compartment 12, 14, 16, 18 increases as the moisture from the food product in the compartment creates steam as it approaches its boiling point. The heightened pressure resulting from the presence of the trapped steam causes the temperature within the compartment 12, 14, 16, 18 to increase above a temperature able to be achieved at ambient pressures.

The amount of pressure that can be achieved within the compartment 12, 14, 16, 18 can be controlled, for example, by varying the degree of adhesive power between the compartment 12, 14, 16, 18 and the covering 11. The greater the adhesive power, the greater the pressure that must achieved to accomplish venting. For example, a heat seal typically has greater adhesive power than a seal created using a food-grade adhesive. Steam cooking using the microwave cooking tray 8 of the present invention thus results in more consistent heating throughout the food product, faster preparation time, and an end product with desirable texture and consistency.

As mentioned above, because different amounts of steam are produced when different foods are heated, and because different foods have different original textures and consistencies, the size and shape of the microwave cooking tray 8 being used to steam cook a particular food plays an important role in that food's final texture and consistency. Therefore, the size and shape of each individual compartment 12, 14, 16, 18 must be designed to achieve an optimal cooking environment for the type of food contained therein.

Because volume is an important variable in the kinetic theories of gases, it is logical that the cooking environment within the compartment 12, 14, 16, 18 could be altered by increasing the area of the bottom surfaces 22, 24, 26, 28, adjusting the height of the side walls 32, 34, 36, 38 or otherwise changing the volume of the compartment 12, 14, 16, 18. Additionally, the path of the steam used to cook the food may be manipulated to provide the best cooking environment. This manipulation of steam paths can be accomplished by changing the shape of the compartment 12, 14, 16, 18, for example, the pattern on the bottom surface 22, 24, 26, 28 of each compartment 12, 14, 16, 18.

The bottom surface 22, 24, 26, 28 of each compartment 12, 14, 16, 18 may be flat, as in the first compartment 12, or have one of several other patterns. For example, the bottom surface 24 of the second compartment 14 has a ribbed pattern with a plurality of rib projections 54 raised from the bottom surface 24 to provide an elevated cooking plane. For another example, the bottom surface 26 of the third compartment 16 has a sinusoidal pattern with a plurality of sinusoidal projections 56 raised therefrom. For yet another example, the bottom surface 28 of the fourth compartment 18 has a pyramidal pattern with a plurality of pyramid-shaped projections 58 raised therefrom. Of course, many other shapes for the bottom surface of the compartment can be contemplated.

When the bottom surface 22, 24, 26, 28, or floor, of a compartment has raised projections, steam channels or pathways of various shapes are formed between the projections and beneath the cooking plane allowing steam to travel all around the food cooked in the tray 8. The size and shape of the steam channels created by the floor pattern will differ based on the type of floor pattern being used, thereby creating unique cooking environments.

It has been found that certain raised floor patterns provide better steam cooking environments for certain types of foods. For example, rib projections 54 allows solid proteins, such as chicken or fish, to achieve excellent texture and consistency when steam cooked in a microwave oven. Similarly, pyramidal projections 58 provides a good cooking environment for foods with heavy sauces; sinusoidal projections 56 are good for foods without sauces such as plain vegetables; and the flat floor 22 is good for foods with a high sugar content, such as desserts.

By creating a microwave cooking tray 8 having multiple compartments 12, 14, 16, 18, each with a floor pattern designed to provide an optimal cooking environment for the type of food contained therein, various food combinations can be cooked in a single tray 8 while ensuring that each type of food is able to achieve a desired texture and consistency.

It will be obvious to those skilled in the art that other modifications may be made to the invention described herein without departing from the spirit and scope of the present invention.

The invention claimed is:

1. A microwave cooking tray, comprising:
 a base having at least two compartments, each compartment having a bottom surface defining a bottom surface pattern, the bottom surface of one of said compartments defining a first bottom surface pattern having a plurality of projections and a bottom surface of a second of said compartments defining a second bottom surface pattern, wherein said first and second bottom surface patterns are distinct from each other and each designed for optimal cooking of a particular type of food product, further wherein said first and second bottom surface patterns are selected from the group consisting of a ribbed pattern, a sinusoidal pattern, and a pyramidal pattern; and a covering secured to said base and sealing each compartment.

2. The microwave cooking tray as recited in claim 1, wherein said covering is selected from the group consisting of a rigid snap-on lid, a film, and a vacuum pack bag.

3. The microwave cooking tray as recited in claim 1, and further comprising at least one steam operated vent associated with each compartment, each vent opening when a desired pressure within th associated compartment is reached.

4. A method for packaging food in a microwave cooking tray, comprising the steps of:

providing a tray comprising a base having at least two compartments, placing a first food type in a first compartment having a bottom surface defining a first bottom surface pattern having a plurality of projections, wherein said first bottom surface pattern is designed for optimal cooking of the first food type;

placing a second food type in a second compartment having a bottom surface defining a second bottom surface pattern, wherein said second bottom surface pattern is designed for optimal cooking of the second food type and is distinct from said first bottom surface pattern, further wherein said first and second bottom surface patterns are selected from the group consisting of a ribbed pattern, a sinusoidal pattern, and a pyramidal pattern; and securing a covering to the base, thereby enclosing the food types within the compartments such that the food types may be cooked simultaneously in the tray, each food type being cooked in an optimal cooking environment.

5. The method for packaging food in a microwave cooking tray as recited in claim 4, wherein said covering is selected from the group consisting of a rigid snap-on lid, a flexible film seal, and a vacuum pack bag.

6. The method for packaging food in a microwave cooking tray as recited in claim 4, and further comprising the step of providing a predetermined degree of adhesive power between each compartment and the covering such that a desired pressure within each compartment is reached before steam operated venting occurs.

* * * * *